(No Model.)
L. KESSLER.
FISHING APPARATUS.
No. 281,083. Patented July 10, 1883.
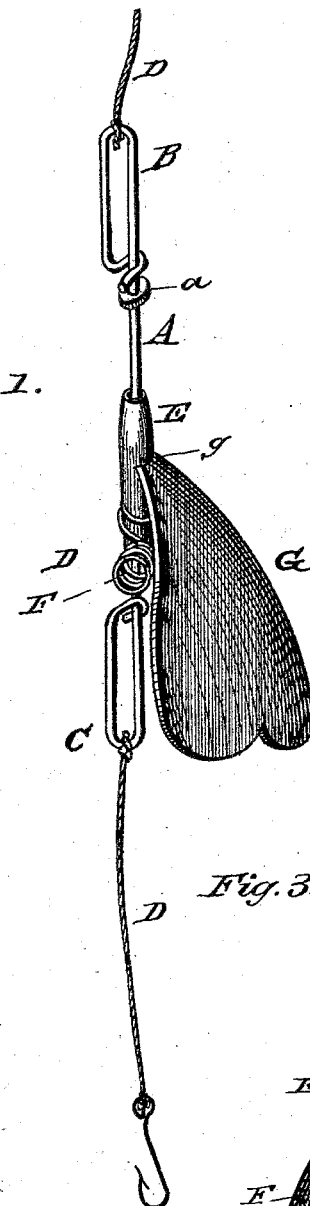
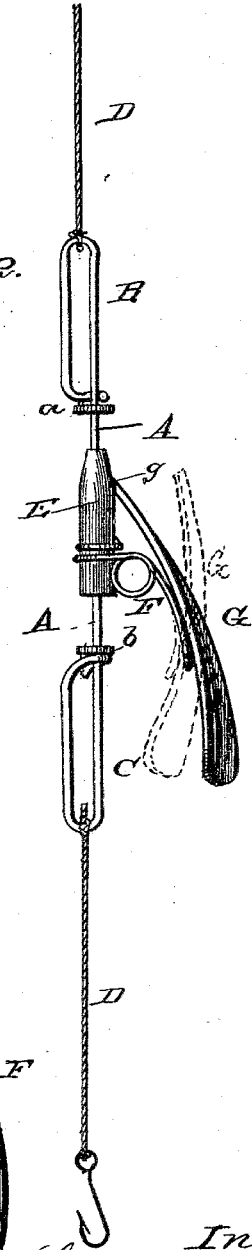
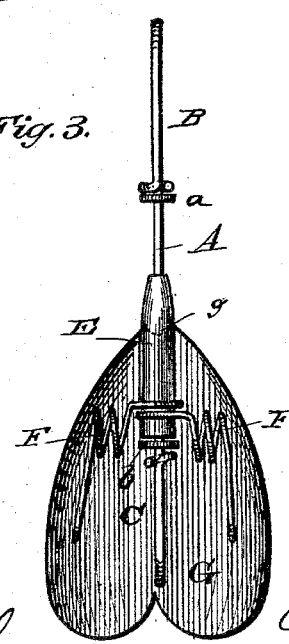
Witnesses:
Phil. C. Dieterich.
Maurice Delmar.
Inventor:
Louis Kessler.
By Louis Bagger & Co.
Attorneys.

UNITED STATES PATENT OFFICE.

LOUIS KESSLER, OF LUDINGTON, MICHIGAN.

FISHING APPARATUS.

SPECIFICATION forming part of Letters Patent No. 281,083, dated July 10, 1883.

Application filed March 16, 1883. (No model.)

*To all whom it may concern:*

Be it known that I, LOUIS KESSLER, of Ludington, in the county of Mason and State of Michigan, have invented certain new and useful Improvements in Fishing Apparatus; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved device. Fig. 2 is a side view of the same, and Fig. 3 is a rear view.

Similar letters of reference indicate corresponding parts in all the figures.

My invention has relation to that class of fishing apparatus generally known as "spoon-hooks" or "spoon-bait," adapted to be used in trolling; and it consists in the detailed construction and combination of parts of such an apparatus, in which the forward end of the rotating yielding spoon-shaped shield is free, allowing it to tilt away from the rotating sleeve, upon which it is fastened, as hereinafter more fully described and claimed.

In the usual construction of spoon-bait, the forward end of the spoon is rigid with or hinged to the rotating sleeve, allowing it to yield to a certain degree to the pressure from forward as it is drawn through the water, but still causing it to offer a large amount of resistance, and consequently a severe strain upon the line, especially if drawn with considerable speed through the water; and to avoid this I attach my spoon upon the ends of coiled springs fastened to the rotating sleeve, at the center of the inner concave side of the spoon, allowing it to tilt away from the sleeve when drawn speedily through the water, thus causing it to offer less resistance in the water, only presenting its point to it, as shown in dotted lines in Fig. 2.

In the accompanying drawings, A is a thin metal rod or wire, which is bent to form eyes or loops B and C at opposite ends, to which loops the fishing-line shown at D is attached, the hook being fastened at the end of that part of the line which is attached to the lower eye, C.

On rod A, between its loops or eyes B C, slides a sleeve or collar, E, the play of which extends between two small washers, $a$ and $b$, on rod A, between which it has a free sliding motion up or down.

To the lower end of collar E is soldered or otherwise fastened a piece of spring-wire which is bent to form spring-coils F F, one on each side of the central fastening, and the free ends of which are soldered or otherwise fastened to the inner concave side of the spoon-shaped shield G. I prefer to make the latter of a heart shape, as shown in the drawings, making a notch or recess, $g$, at its upper end, where it impinges upon the tapering top of the sliding collar E.

From the foregoing it will be seen that shield G is not fixed immovably upon its collar, but that it is capable of a limited motion, not only up or down upon rod A, with the collar to which it is attached, but that it may be moved with its upper notched end out from the stem if pressure is exerted against its lower end. It follows that if the fish should bite at it, it is not liable to be broken off from the line-rod A or to be bent out of shape, as it will yield to the contact and reassume its normal condition and shape as soon as left to itself. Again, if used for trolling, the spring will give the shield a vibratory motion as it is drawn through the water, which still further serves to simulate the motion of a living fish in the water.

Having thus described my invention, I claim and desire to secure by Letters Patent of the United States—

In a spoon-hook, the rotating spoon-shaped shield fastened at the center of its inner concave side to the outer ends of coiled springs fastened to the side of the rotary sleeve, as and for the purpose shown and set forth.

In testimony that I claim the foregoing as my own I have hereunto affixed my signature in presence of two witnesses.

LOUIS KESSLER.

Witnesses:
D. V. SAMUELS,
JOHN BETHEM.